US009534755B2

(12) United States Patent
Blandin et al.

(10) Patent No.: US 9,534,755 B2
(45) Date of Patent: Jan. 3, 2017

(54) OPTICAL MODULE WITH COMMON PART REFERENCE FOR MOTOR VEHICLE LIGHTING AND/OR SIGNALLING

(75) Inventors: Jonathan Blandin, Les Pavillons Sous Bois (FR); Eric Mornet, Nogent sur Marne (FR); Magdalena Perez, Martos (ES)

(73) Assignee: Valeo Vision, Bobigny (FR)

( * ) Notice: Subject to any disclaimer, the term of this patent is extended or adjusted under 35 U.S.C. 154(b) by 90 days.

(21) Appl. No.: 14/240,155

(22) PCT Filed: Sep. 12, 2012

(86) PCT No.: PCT/EP2012/067777

§ 371 (c)(1), (2), (4) Date: Apr. 22, 2014

(87) PCT Pub. No.: WO2013/037799

PCT Pub. Date: Mar. 21, 2013

(65) Prior Publication Data

US 2014/0226355 A1 Aug. 14, 2014

(30) Foreign Application Priority Data

Sep. 13, 2011 (FR) ..................................... 11 58106

(51) Int. Cl.
*B60Q 1/00* (2006.01)
*F21S 8/10* (2006.01)

(52) U.S. Cl.
CPC ............ *F21S 48/10* (2013.01); *F21S 48/1109* (2013.01); *F21S 48/1159* (2013.01); *F21S 48/1216* (2013.01); *F21S 48/1266* (2013.01); *F21S 48/1305* (2013.01); *F21S 48/1388* (2013.01); *F21S 48/321* (2013.01); *F21S 48/328* (2013.01)

(58) Field of Classification Search
CPC .......... F21S 48/10; F21S 48/11; F21S 48/115; F21S 48/1154; F21S 48/1208; F21S 48/1233; F21S 48/125; F21S 48/1258; F21S 48/1305; F21V 29/02; F21V 29/10; F21V 29/15; F21V 29/20; F21V 29/76; F21V 29/763; F21V 29/767
USPC ................................ 362/509, 545, 547, 549
See application file for complete search history.

(56) References Cited

U.S. PATENT DOCUMENTS

| | | | | |
|---|---|---|---|---|
| 6,123,429 | A * | 9/2000 | Osawa | F21S 48/1388 313/113 |
| 7,014,344 | B2 | 3/2006 | Goraguer | |
| 7,258,466 | B2 | 8/2007 | Watanabe et al. | |
| 7,798,690 | B2 | 9/2010 | Watanabe et al. | |
| 7,963,684 | B2 * | 6/2011 | Staub | F21S 48/1159 362/507 |

(Continued)

FOREIGN PATENT DOCUMENTS

| | | |
|---|---|---|
| DE | 202010003680 | 7/2010 |
| FR | 2828551 | 2/2003 |

(Continued)

*Primary Examiner* — Ali Alavi
(74) *Attorney, Agent, or Firm* — Jacox, Meckstroth & Jenkins

(57) ABSTRACT

An optical module for a lighting and/or signaling device of a vehicle, comprising at least one light source capable of generating a light beam, a cooling device capable of dissipating heat and a device for focusing the light beam, characterized in that the focusing device is borne directly by the cooling device.

16 Claims, 5 Drawing Sheets

(56) References Cited

U.S. PATENT DOCUMENTS

| | | | | |
|---|---|---|---|---|
| 8,534,888 | B2 * | 9/2013 | Yasuda | F21S 48/1159 362/303 |
| 2004/0202008 | A1 | 10/2004 | Goraguer | |
| 2004/0264195 | A1 * | 12/2004 | Chang | F21K 9/00 362/294 |
| 2005/0180157 | A1 | 8/2005 | Watanabe et al. | |
| 2007/0025117 | A1 * | 2/2007 | Watanabe | F21S 48/1159 362/545 |
| 2009/0097269 | A1 * | 4/2009 | Stauss | F21S 48/1159 362/539 |
| 2010/0006554 | A1 * | 1/2010 | Inoue | F21S 48/1159 219/202 |
| 2010/0008099 | A1 * | 1/2010 | Inoue | F21S 48/1145 362/520 |
| 2010/0073950 | A1 * | 3/2010 | Kawamura | B60Q 1/2696 362/538 |
| 2011/0261568 | A1 * | 10/2011 | Dalsgaard | F21V 21/30 362/249.03 |
| 2012/0195058 | A1 * | 8/2012 | Uchida | F21S 48/1154 362/520 |
| 2012/0224384 | A1 * | 9/2012 | Takahira | F21V 9/16 362/509 |
| 2012/0314431 | A1 * | 12/2012 | Lin | F21V 19/0045 362/382 |

FOREIGN PATENT DOCUMENTS

| | | |
|---|---|---|
| FR | 2865524 | 7/2005 |
| FR | 2889290 | 2/2007 |
| FR | 2922296 | 4/2009 |

* cited by examiner

OPTICAL MODULE WITH COMMON PART REFERENCE FOR MOTOR VEHICLE LIGHTING AND/OR SIGNALLING

CROSS-REFERENCE TO RELATED APPLICATIONS

This application claims priority to PCT Application PCT/EP2012/067777 filed Sep. 12, 2012, and also to French Application No. 1158106 filed Sep. 13, 2011, which are incorporated herein by reference and made a part hereof.

BACKGROUND OF THE INVENTION

1. Field of the Invention

The technical field of the present invention is that of optical modules intended to produce a light beam in order to light a road taken by a vehicle bearing this optical module. Such an optical module is particularly applicable when it is installed inside a lighting and/or signaling device for a motor vehicle.

2. Description of the Related Art

It is known practice to produce a light function on a motor vehicle by focusing light rays emitted by a light source. The optical parts used to focus these light rays are, generally, installed between the light source, for example a xenon lamp, and an outer lens enclosing a headlight which receives this assembly.

Such an optical part is an isotropic and transparent element, with at least one face which is not planar, so as to make the light converge or diverge.

In the motor vehicle lighting sector, it is also known practice to use a light source of light-emitting diode type. This type of source is accompanied by a device for switching the source on or off, and these two elements give off heat that a cooling device is responsible for dissipating into the surrounding environment.

An optical part of the prior art is mounted with an assembly consisting of a light-emitting diode and its cooling device by interposing a part which maintains a certain distance between the optical part and the assembly. This is generally a plastic support which is fastened on one side to the periphery of the optical part and on the other side to the assembly consisting of the light-emitting diode and its cooling device.

The presence of this support comprises numerous drawbacks. Firstly, this support forms a part which has to be designed, manufactured and installed. This part thus represents a cost which puts a strain on the overall cost of the lighting function.

Another drawback lies in the fact that this support is a distinct and intermediate part between the assembly targeted above and the optical part. Since the latter has to be installed according to a precise orientation relative to the assembly, it is then necessary to manage, on the one hand, very accurately, the chain of banks linking these components, and, on the other hand, to guarantee a minimal manufacturing tolerance of this intermediate support.

SUMMARY OF THE INVENTION

The aim of the present invention is therefore to resolve the drawbacks described above mainly by directly referencing the optical part on the cooling device.

The subject of the invention is therefore an optical module for a lighting and/or signaling device of a vehicle, comprising at least one light source capable of generating a light beam, one cooling device capable of dissipating heat and one device for focusing the light beam wherein the focusing device is borne directly by the cooling device.

The function of the focusing device is to concentrate the light rays emitted by the source to direct them toward an area of the road to be lit. Such a focusing device is, for example, a lens, or even a multiplicity of lenses.

According to a first feature of the invention, the cooling device comprises at least one first portion intended to pick up the heat and at least one second portion derived from said first portion, that is to say which emerges therefrom, and on which the focusing device rests.

According to a second feature of the invention, the second portion comprises a cavity in which a protuberance of the focusing device is housed, said protuberance being delimited by at least two walls of a form complementing at least two faces delimiting the cavity.

According to another feature of the invention, the module comprises at least one collector, or collector element comprising a plurality of collectors, capable of returning the light beam emitted by the light source at least toward the focusing device.

According to yet another feature of the invention, a fastening means is provided for securely attaching the focusing device to the cooling device.

According to yet another feature of the invention, the fastening means is a staple engaged both on the focusing device and on the cooling device.

According to a variant of the invention, the fastening means for securely attaching the focusing device to the cooling device is made of the same material as the collector.

Advantageously, the collector is securely attached to the cooling device by at least one secure attachment element, said secure attachment element being arranged to press the protuberance into the cavity.

Also advantageously, the fastening means is formed by an arch with at least one flank in contact with a rim of the focusing device.

According to one feature of the optical module, the fastening means comprises at least one deformable element.

The optical module according to the invention comprises at least one printed circuit board directly in contact with the cooling device, said printed circuit board receiving said light source.

The module also comprises at least one folding unit directly in contact with the cooling device.

The invention also covers a lighting and/or signaling device for a motor vehicle comprising at least one optical module according to any one of the features presented above.

Such a device is arranged to participate in the production of a code function of a motor vehicle.

One prime advantage according to the invention lies in the elimination of a part in an optical module intended to be used on a motor vehicle. The cost of the lighting function implemented by the optical module according to the invention can thus be reduced.

Another advantage lies in the increased reliability of the assembly of such a module. In practice, the chain of banks between the light source and the focusing device is reduced, which increases the level of accuracy and of reliability of the module according to the invention.

These and other objects and advantages of the invention will be apparent from the following description, the accompanying drawings and the appended claims.

BRIEF DESCRIPTION OF THE ACCOMPANYING DRAWINGS

Other features, details and advantages of the invention will become more clearly apparent on reading the description given below by way of indication in relation to the drawings in which.

DETAILED DESCRIPTION OF THE PREFERRED EMBODIMENTS

Figure 1:
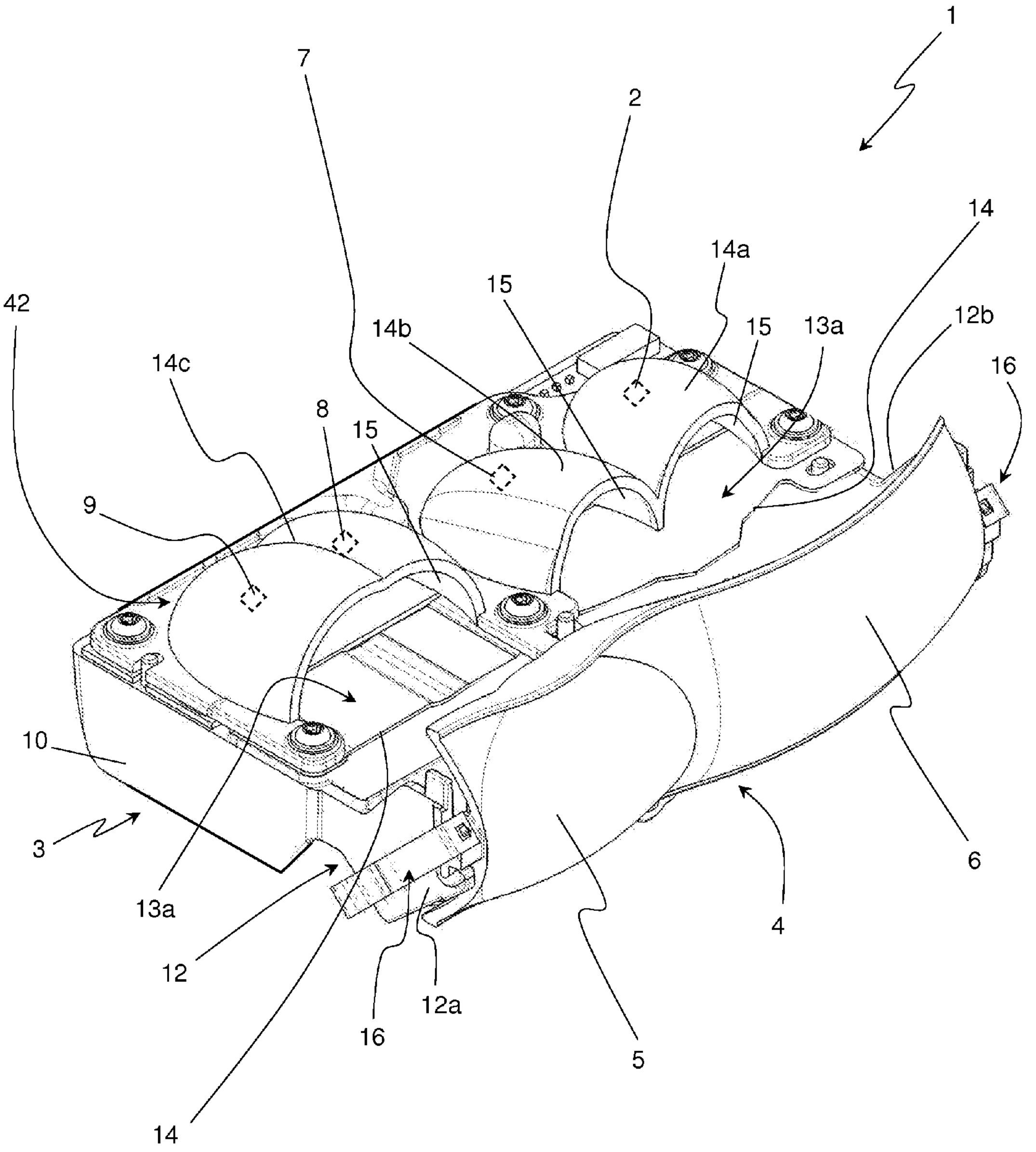
FIG. 1 is a perspective view of an optical module according to the invention.

FIG. 1 illustrates an optical module 1 according to the invention. Such an optical module 1 is intended to be incorporated in a front headlight or headlamp of a motor vehicle. The function of this optical module 1 is to generate at least one light beam and to project this beam onto a road taken by the vehicle. Such an optical module 1 participates in the production of a beam of code type or of a beam of road type, the description below being limited to the example of the beam of code type.

This optical module 1 comprises at least one light source 2 which forms the element generating the light rays of the light beam. Since this light source 2 releases heat, the optical module 1 also comprises a cooling device 3 responsible for picking up at least the heat generated by the light source 2 and dissipating it into the air surrounding the optical module 1. This cooling device 3 is notably formed by a heat-sink or dissipater manufactured in aluminum alloy.

The optical module 1 also comprises a focusing device 4, the function of which is to concentrate the light rays emitted by the light source 2 to direct them toward the area of the road to be lit. Such a focusing device 4 is, for example, a lens 5, or even a multiplicity of lenses 5 and 6.

According to the invention, the focusing device 4 is borne directly by the cooling device 3. It will be understood from this that the focusing device 4 is in physical contact with the cooling device, with no intermediate part or element other than the fastening means which will be detailed below.

According to the exemplary embodiment shown in this figure, the optical module 1 can be improved when the latter comprises a plurality of light sources 2, 7, 8 and 9, notably four light sources. This optical module 1 is then able to project a first light beam and a second light beam. According to an exemplary embodiment, the first light beam exhibits, in projection onto a screen at right angles to an optical axis of the optical module 1, a planar trim in order to fulfill the code function of a lighting device. The second light beam can then form a beam of road type. Alternatively, the second light beam can form, in projection onto a screen at right angles to the optical axis, a trim line comprising two branches forming between them a non-zero angle, which corresponds to a type of code beam.

According to an exemplary embodiment, the first light beam is generated by a first pair of light sources 2 and 7, whereas the second light beam is generated by a second pair of light sources referenced 8 and 9.

The cooling device 3 comprises a first portion 10 intended to pick up the heat generated among others by the light source or sources 2, 7 to 9. This first portion 10 receives a printed circuit board 11 (FIG. 6) which rests on a top face of the first portion 10 (FIG. 1). This printed circuit board 11 bears at least one of the light sources 2, 7, 8 or 9, and advantageously all four light sources 2, 7 to 9.

The cooling device 3 comprises at least one second portion 12 which emerges from the first portion 10 and which is made of the same material as the first portion 10. In the example of FIG. 1, the cooling device 3 comprises at least one second portion 12 which, for example, takes the form of a first arm 12*a* and of a second arm 12*b* each formed at one end of the first portion 10.

The at least one second portion 12 is a protuberance on which the focusing device 4 is placed.

In the example of FIG. 1, it will be noted that the light source or sources 2 and 7 to 9 are light-emitting diodes, for example of single-chip type or even of multi-chip type.

The printed circuit board 11 also bears electronic components, some of them dedicated to switching one or more light sources 2, 7 to 9 on or off. These components are also heat generators and the contact between the printed circuit board 11 and the first portion 10 of the cooling device 3 makes it possible to dissipate the latter into the air surrounding the optical module 1.

The optical module 1 according to the invention also comprises at least one folding unit 13*a*, the function of which is to block the part of the light beam which extends above the horizontal axis. This folding unit 13*a* is employed when the optical module 1 according to the invention participates in the production of the code function of the motor vehicle. Such blocking, otherwise called a trim, of the beam is applied by a trimming edge 14 which is part of the folding unit 13*a*.

In the example of FIG. 1, the optical module 1 comprises two folding units 13*a* and 13*b*, of which a first, referenced 13*a*, is dedicated to a first pair of light sources 2 and 7 while a second folding unit, referenced 13*b*, is dedicated to the second pair of light sources 8 and 9.

The optical module 1 according to the invention can also comprise at least one collector 14*a* capable of returning the light beam emitted by the light source 2 at least toward the focusing device 4. Such a collector 14*a* is a part in the form of a dome which covers the light source 2. This collector 14*a* has an internal face 15 which is reflective so as to return a maximum of light rays toward the focusing device 4.

In the example of FIG. 1, the optical module comprises a multiplicity of collectors, in particular three collectors 14*a*, 14*b* and 14*c* combined to form a collector element 42. A first collector 14*a* covers the first light source 2, a second collector 14*b* covers the second light source 7 and a third collector 14*c* covers the pair formed by the third and fourth light sources 8 and 9. For this, the third collector 14*c* has a section with dual radii of curvature.

The focusing device 4 is linked by physical contact to the second part 12 of the cooling device 3. The focusing device 4 is securely attached to the first arm 12*a* and to the second arm 12*b* by a fastening means 16 which will be discussed in detail with the following figures.

Figure 2:
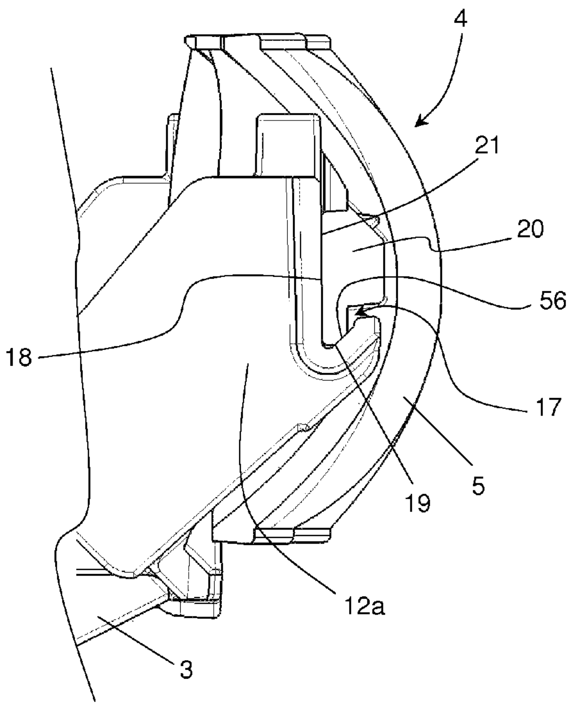
FIG. 2 is a detail and side view showing the relationship between the cooling device and the focusing device.

FIG. 2 shows in detail the manner in which the focusing device 4 cooperates with the cooling device 3. It shows the first arm 12*a*, at the end of which is formed a cavity 17. The latter is delimited by a first face 18 and by a second face 19. This first face 18 extends in a plane which forms an acute angle with a plane which passes through the second face 19. Such an organization makes it possible to form the "V" shaped cavity 17.

The focusing device 4 comprises two ends on the horizontal axis. At least one of its ends, and advantageously both, comprises a protuberance 20 which emerges from this end along the horizontal axis. This protuberance 20 has a form, notably a section, which complements the form of the cavity 17. Thus, this protuberance 20 is housed in the cavity 17, which makes it possible to ensure a first mechanical fix between these two parts.

The protuberance 20 is delimited by a first wall 21 and by a second wall 56. This first wall 21 extends in a plane which forms an acute angle with a plane which passes through the second wall 56. The plane in which the first wall 21 extends is moreover substantially parallel, parallel to the plane in which the first face 18 extends. The plane in which the second wall 56 extends is also substantially parallel, or parallel, to the plane in which the second face 19 extends.

Figure 3:
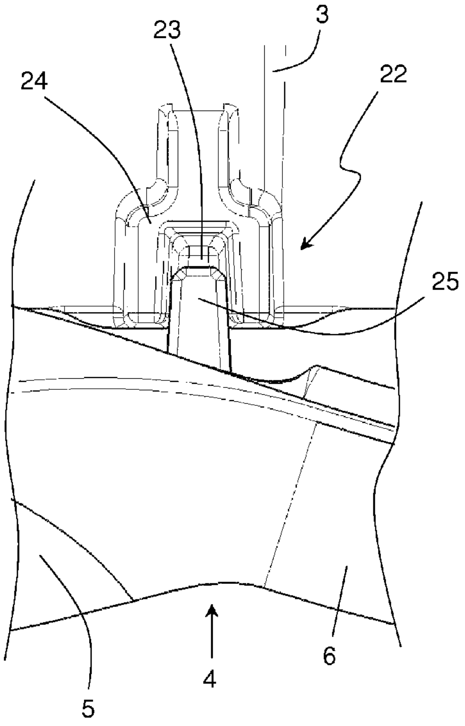
FIG. 3 is a partial plan view showing a central linkage point between the cooling device and the focusing device.

The mechanical link between the cooling device 3 and the focusing device 4 is reinforced by the addition of a linkage point 22 represented in FIG. 3. As an example, this linkage point 22 is formed between a first lens 5 and a second lens 6 that are parts of the focusing device 4. The linkage point 22 comprises a housing 23 which has a "U" section. This housing 23 is produced by a block 24 made of the same material as the cooling device 3. On the side of the focusing device 4, the latter comprises a finger 25 made of the same material as the focusing device 4, notably from the molding thereof. The link is made when the finger 25 penetrates into the housing 23, by being, for example, force-fitted into the latter.

This linkage point 22 ensures a longitudinal centering of the focusing device 4 with respect to the cooling device 3.

Figure 4:
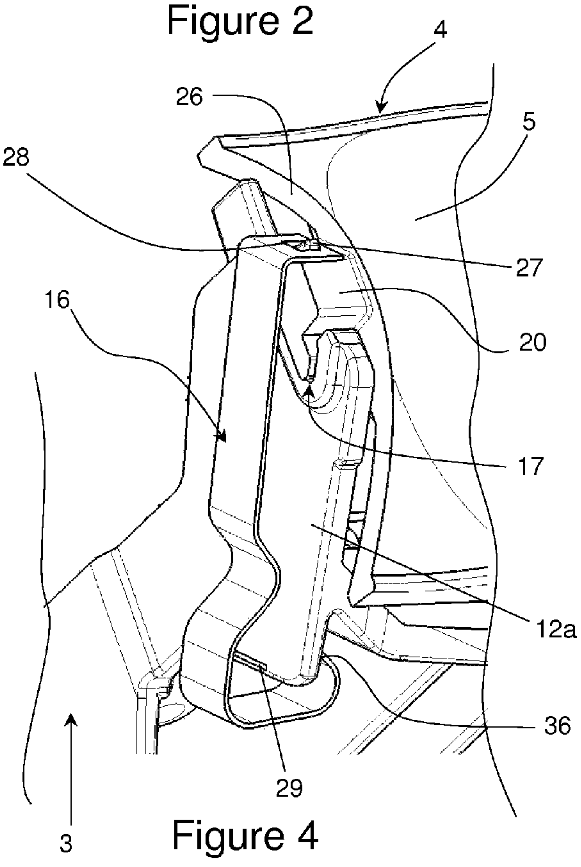
FIG. 4 is a detail and perspective view of the fastening means constituting the invention.

FIG. 4 is a perspective view of the detail of the mechanical link made between the cooling device 3 and the focusing device 4. The protuberance 20 emerges from a rim 26 which edges the first lens 5 and is housed in the cavity 17 formed at the end and in the thickness of the first arm 12*a*.

The fastening means 16 fulfills three functions in combination. A first function thereof is to guarantee the securing of the protuberance 20 in the cavity 17. Any movement and any possibility of having the focusing device 4 become detached from the cooling device 3 is thus avoided. The second function lies in an absorption of the dimensional tolerances of the cooling device 3 or of the focusing device 4. A third function lies in an intrinsic resilience which makes it possible for the fastening means 16 to allow, to a certain extent, expansions, notably from heat.

The protuberance 20 is delimited by a top face. From the latter emerges a snug 27 which cooperates with a hole 28 formed at an end of the fastening means 16. This hole 28 and this snug 27 form a locking means for the fastening means 16.

At the other end of the fastening means 16, a shoulder 36 is provided which cooperates with the first arm 12*a*, a free end of the fastening means 16 coming into contact on a side and on a bottom edge of the first arm 12*a*.

According to a practical exemplary embodiment, the fastening means 16 is a staple engaged both on the focusing device 4 and on the cooling device 3.

It will finally be noted that this fastening means 16 according to this first variant embodiment is removable, independently of the other components, this fastening means 6 being produced by a part that is separate and distinct from the other components of the optical module 1.

Figure 5:
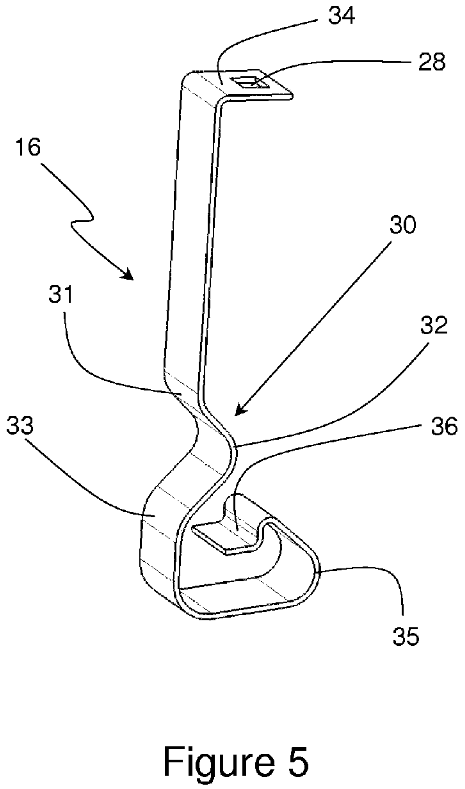
FIG. 5 is a perspective view of the fastening means.

FIG. 5 shows the structure of this fastening means 16. It has a function for absorbing the dimensional tolerances of the focusing device 4 and/or of the cooling device 3. It also has a function making it possible to absorb the expansions of these components as a result of the heat losses.

The fastening means 16 is thus formed by a pawl, that is to say a metal strip. This fastening means 16 comprises at least one deformable means 30 produced in the form of three folds 31, 32 and 33. These three folds 31, 32 and 33 confer a flexibility on the fastening means 16 in its length.

The first end of the fastening means 16 is terminated by a flat 34 folded at right angles and through which is formed the hole 28. The second end comprises a "V" shaped fold 35 followed by the shoulder 36.

Figure 6:
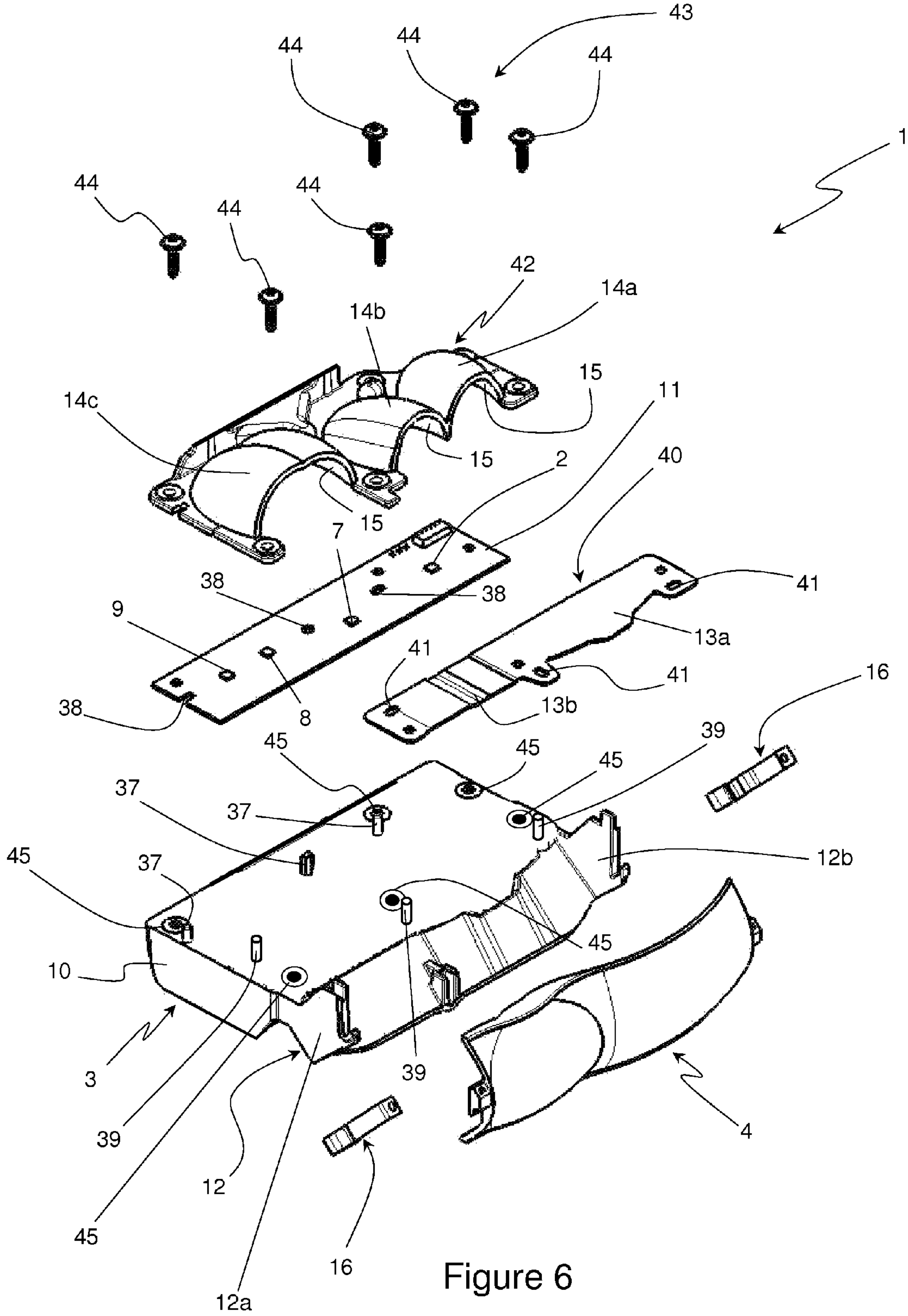
FIG. 6 is an exploded view of the optical module represented in FIG. 1.

FIG. 6 shows the different components of an exemplary embodiment of the optical module 1 conforming to the first embodiment. The cooling device 3 forms a common support on which these components are fastened. As explained above, the focusing device 4 rests on the second portion 12 of the cooling device 3 and is maintained directly thereon by a fastening means 16, here consisting of two staples. The second portion 12 thus comprises at least the first arm 12*a* and the second arm 12*b*.

The first portion 10 of the cooling device 3 comprises a plurality of first centering devices 37 on which the printed circuit board 11 is threaded. These centering devices 37 guarantee a positioning of the printed circuit board 11 in relation to the cooling device 3 because the light sources 2, 7 to 9 are installed on the printed circuit board 11, advantageously on one and the same face thereof. The first centering devices 37 are molded with the cooling device 3. The latter cooperate with orifices 38 formed through the printed circuit board 11.

It will be understood from the preceding paragraph that the cooling device 3 serves as a mechanical reference for the light sources 2, 7-9, in particular via the printed circuit board 11, the latter being directly in contact with the cooling device 3.

The first portion 10 also comprises a series of second centering devices 39 which ensure the positioning of the folding unit 13*a* or 13*b*, the latter being combined so as to form just one part referenced 40. This part, whose function is to generate the trim of a code beam, comprises holes 41 into which the second centering devices 39 penetrate. It will also be understood here that the cooling device 3 forms a mechanical reference for the folding unit-forming part 40, the latter being directly in contact with or bearing on the cooling device 3.

The printed circuit board 11 and the folding unit-forming part 40 are inserted between the cooling device 3 and the collector element 42 which combines in one part at least two collectors 14*a* and 14*b*. In this exemplary embodiment, the collector element 42 comprises the three collectors 14*a*, 14*b* and 14*c* detailed in FIG. 1. This collector element 42 is a part made of molded plastic whose internal faces 15 comprise an aluminized layer, which makes it possible to reflect the light rays emitted by the light sources 2, 7-9.

The definitive fastening of the collector element 42 onto the cooling device 3 is ensured by a secure attachment element 43. Advantageously, this secure attachment element 43 also ensures the definitive fastening of the printed circuit board 11 and/or of the folding unit-forming part 40. According to this example, this secure attachment element 43 is formed by at least one screw 44 which fits into a corresponding tapped hole 45 formed in the cooling device 3.

Figure 7:
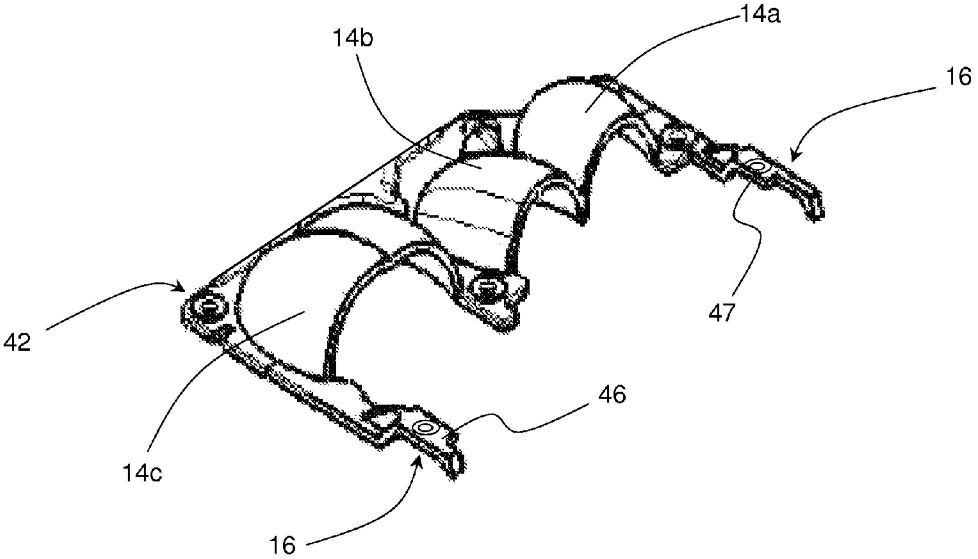
FIG. 7 is a perspective view of a component of the optical module according to a first variant embodiment.

FIG. 7 represents at least one collector 14*a* and one fastening means 16 according to a second variant of the invention. As for FIG. 6, the plurality of collectors 14*a*, 14*b* and 14*c* is combined in one part produced by a collector element 42 but obviously, the description below covers a minimal combination comprising a single collector.

Unlike the first variant of the invention, the fastening means 16 is not provided by a separate and distinct part. This fastening means 16 here forms an integral part of the collector element 42. This fastening means 16 is thus formed by at least one first branch 46 and one second branch 47 made of the same material as the collector element 42. These two branches 46. 47 extend in the direction of the optical axis of the optical module 1 and have a form complementing the first arm 12*a*, respectively the second arm 12*b*, of the second portion 12 constituting the cooling device 3.

Figure 8:
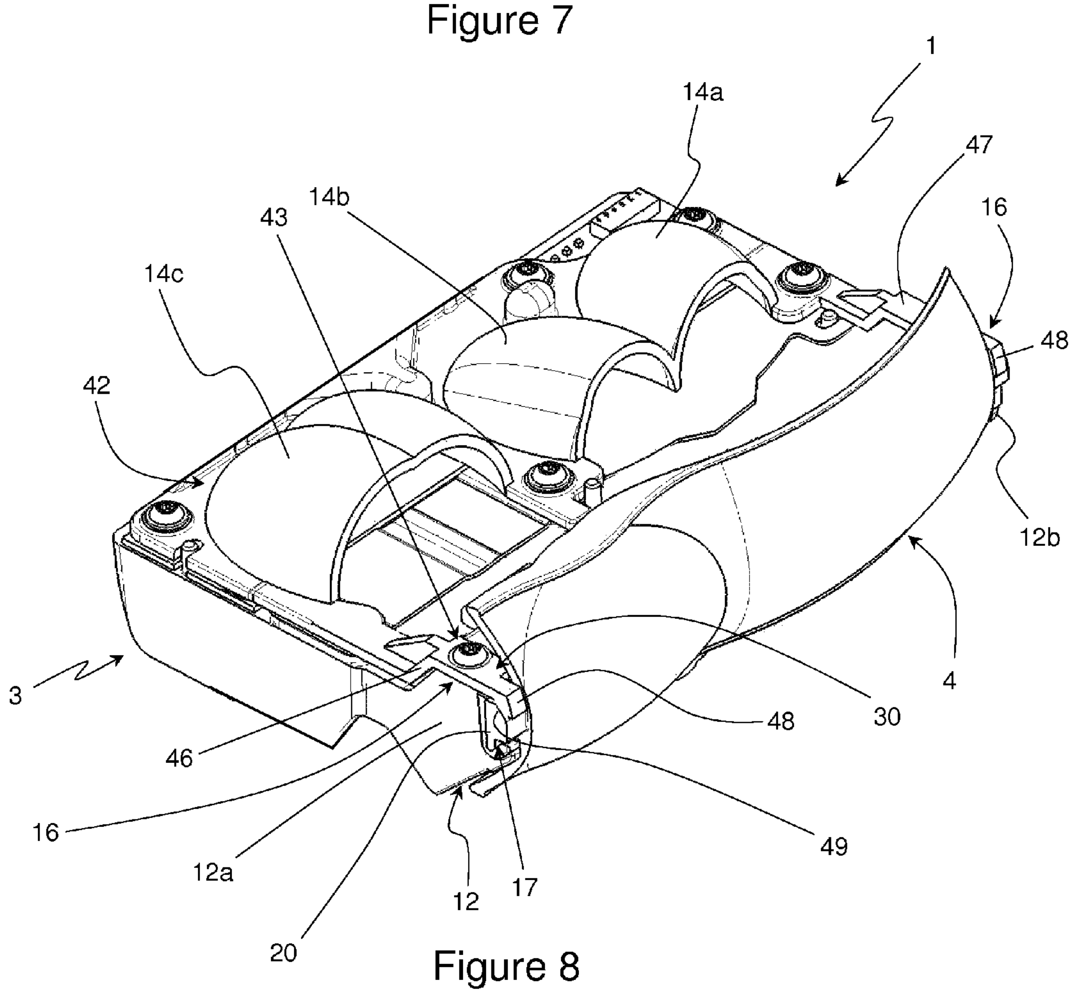
FIG. 8 is a perspective view of the first variant of the optical module.

Reference is now made to FIG. 8. The fastening means 16 detailed here comprises a deformable element or means 30, the functions devolved to this deformable means 30 being identical to those described in relation to the first variant. This deformable means 30 lies in the flexibility of the constituent material of the first and second branches 46 and 47. In practice, the plastic material employed for manufacturing the collector element 42 is chosen to benefit from a resilience capable of absorbing tolerance deviations and expansions.

Alternatively, or additionally, this flexibility can be produced by the particular form of the branches 46, 47, in particular their thickness.

This figure also shows that a free end of the first branch 46 and of the second branch 47 comprises a hook 48 whose beveled face 49 encloses the protuberance 20 of the focusing device 4 in the cavity 17 of the cooling device 3.

The fastening means 16 is, moreover, pressed onto the second portion 12 of the cooling device 3 using a secure attachment element 43. For this, the first branch 46 and/or the second branch 47 comprise a hole through which the secure attachment element 43 passes, the latter being fitted into a tapped hole formed in the first arm 12*a* and/or the second arm 12*b*.

Figure 9:
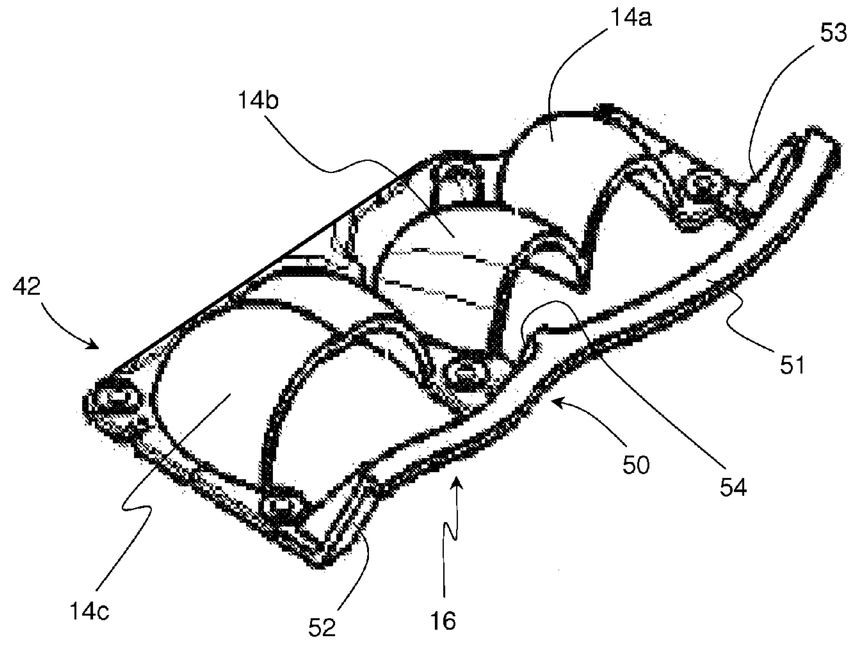
FIG. 9 is a perspective view of a component of the optical module according to a second variant embodiment; and, FIG. 10 is a perspective view of the second variant of the optical module.

FIG. 9 illustrates at least one collector 14*a* and one fastening means 16 according to a third variant of the invention. As for the preceding figures, the plurality of collectors 14*a*, 14*b* and 14*c* is combined in a single part produced by a collector element 42 but, obviously, the description below covers a minimal combination comprising a single collector.

As for the second variant of the invention, the fastening means 16 forms an integral part of the collector element 42. This fastening means 16 is here formed by an arc 50.

Such an arc 50 has a generally "U" shape. A first flank 51 forms the base of the "U" and this first flank 51 is connected to the collector element 42 by at least one second flank 52 and one third flank 53, each situated at one of the ends of the collector element 42, depending on the direction of extension of the collectors 14*a*, 14*b* and 14*c*.

The arc 50 can advantageously comprise an intermediate flank 54 which links the first flank 51 to the rest of the collector element 42 at a point situated between two collectors 14*b* and 14*c*.

As for the second variant, the collector element 42, the first flank 51, the second flank 52, the third flank 53, and possibly the intermediate flank 54, form one and the same part, notably derived from one and the same molding step.

Figure 10:
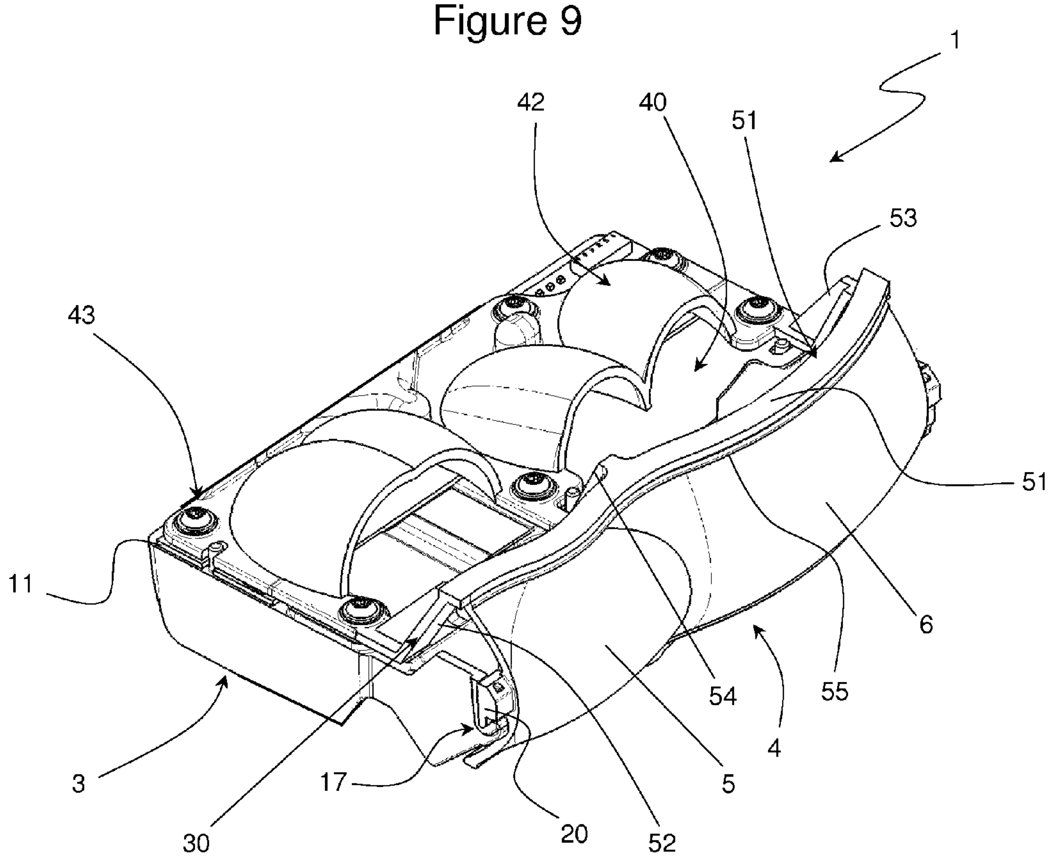

In FIG. 10, the first flank 51 is formed by a flat which follows two radii of curvature, each of the radii of curvature being substantially identical to the radius of curvature followed by the first lens 5 and by the second lens 6.

The secure attachment of the focusing device 4 to the cooling device 3 takes place as follows. The collector element 42, equipped with the arc 50, is installed on the printed circuit board 11 and on the folding unit-forming element 40. The first flank 51 is then bearing on or in contact with a rim 55 of the focusing device 4 so as to exert a force which presses the protuberance 20 into its cavity 17. The installation of the secure attachment device 43, in particular the screws 44 (FIG. 6), definitively secures the focusing device 4 onto the cooling device 3.

The deformable element 30 of the fastening means 16 is here implemented by the determined flexibility of the first flank 52, of the second flank 53, and possibly of the intermediate flank 54, when the optical module 1 according to the invention consists thereof.

One or more optical modules 1 can be incorporated in a lighting and/or signaling device installed on a motor vehicle. It can notably participate in the production of a beam of code type, that is to say with planar trim or with trim inclined according to a non-zero angle, for example between 8° and 15°.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. An optical module for a lighting and/or signaling device of a vehicle, comprising at least one light source capable of generating a light beam, at least one cooling device capable of dissipating heat generated by said at least one light source and at least one focusing device for focusing the light beam, wherein said at least one focusing device is borne directly by said at least one cooling device;

wherein a fastening means is provided for securely attaching said at least one focusing device to said at least one cooling device.

2. The optical module as claimed in claim 1, wherein said at least one cooling device comprises at least one first portion intended to pick up the heat and at least one second portion stemming from said at least one first portion and on which said at least one focusing device rests.

3. The optical module as claimed in claim 2, wherein said second portion comprises a cavity wherein a protuberance of said at least one focusing device is housed, said protuberance being delimited by at least two walls of a form complementing at least two faces delimiting said cavity.

4. The optical module as claimed in claim 3, comprising at least one collector capable of returning the light beam emitted by said at least one light source at least toward said at least one focusing device.

5. The optical module as claimed in claim 1, wherein said fastening means comprises at least one deformable element.

6. The optical module as claimed in claim 1, comprising at least one printed circuit board directly in contact with said at least one cooling device, said at least one printed circuit board receiving said at least one light source.

7. The optical module as claimed in claim 1, wherein said at least one focusing device is a lens, or a multiplicity of lenses.

8. The optical module as claimed in claim 7, arranged to participate in the production of a code function of a motor vehicle.

9. A lighting and/or signaling device for a motor vehicle comprising at least one optical module as claimed in claim 1.

10. An optical module for a lighting and/or signaling device of a vehicle, comprising at least one light source capable of generating a light beam, at least one cooling device capable of dissipating heat and at least one focusing device for focusing the light beam, wherein said at least one focusing device is borne directly by said at least one cooling device;

wherein a fastening means is provided for securely attaching said at least one focusing device to said at least one cooling device;

wherein said fastening means is a staple engaged both on said at least one focusing device and on said at least one cooling device.

11. An optical module for a lighting and/or signaling device of a vehicle, comprising at least one light source capable of generating a light beam, at least one cooling device capable of dissipating heat generated by said at least one light source and at least one focusing device for focusing the light beam, wherein said at least one focusing device is borne directly by said at least one cooling device;

said optical module comprising at least one folding unit directly in contact with said at least one cooling device.

12. An optical module for a lighting and/or signaling device of a vehicle, comprising at least one light source capable of generating a light beam, at least one cooling device capable of dissipating heat generated by said at least one light source and at least one focusing device for focusing the light beam, wherein said at least one focusing device is borne directly by said at least one cooling device;

wherein said at least one cooling device comprises at least one first portion intended to pick up the heat and at least one second portion stemming from said at least one first portion and on which said at least one focusing device rests;

wherein said second portion comprises a cavity wherein a protuberance of said at least one focusing device is housed, said protuberance being delimited by at least two walls of a form complementing at least two faces delimiting said cavity;

said optical module comprising at least one collector capable of returning the light beam emitted by said at least one light source at least toward said at least one focusing device;

wherein a fastening means is provided for securely attaching said at least one focusing device to said at least one cooling device, said fastening means being made of the same material as said at least one collector.

13. The optical module as claimed in claim 12, wherein said at least one collector is securely attached to said at least one cooling device by at least one secure attachment element, said at least one secure attachment element being arranged to press said protuberance into said cavity.

14. An optical module for a lighting and/or signaling device of a vehicle, comprising at least one light source capable of generating a light beam, at least one cooling device capable of dissipating heat generated by said at least one light source and at least one focusing device for focusing the light beam, wherein said at least one focusing device is borne directly by said at least one cooling device;

wherein a fastener is provided for securely attaching said at least one focusing device to said at least one cooling device.

15. An optical module for a lighting and/or signaling device of a vehicle, comprising at least one light source capable of generating a light beam, at least one cooling device capable of dissipating heat and at least one focusing device for focusing the light beam, wherein said at least one focusing device is borne directly by said at least one cooling device;

wherein a fastener is provided for securely attaching said at least one focusing device to said at least one cooling device;

wherein said fastener is a staple engaged both on said at least one focusing device and on said at least one cooling device.

16. The optical module as claimed in claim 14, wherein said fastener comprises at least one deformable element.

* * * * *